United States Patent [19]

Antunez

[11] Patent Number: 5,007,452
[45] Date of Patent: Apr. 16, 1991

[54] BOWL FILL FOR A TANK VALVE

[76] Inventor: Bruce A. Antunez, 1143 Indian Springs, Glendora, Calif. 91740

[21] Appl. No.: 326,916

[22] Filed: Mar. 22, 1989

[51] Int. Cl.⁵ .................. F16K 31/18; F16K 33/00
[52] U.S. Cl. ................... 137/441; 137/414; 137/432; 137/437; 4/366
[58] Field of Search ............ 4/324, 366, 375, 390, 4/391; 137/409, 410, 429, 430, 432, 437, 445, 449; 251/35, 45, 46, 118

[56] References Cited

U.S. PATENT DOCUMENTS

| 3,135,287 | 6/1964 | Kepka et al. | 137/432 |
|---|---|---|---|
| 3,559,675 | 2/1971 | Schoepe et al. | 137/441 |
| 3,576,199 | 4/1971 | Schoepe et al. | 137/441 |
| 3,729,017 | 4/1973 | Brandelli | 137/432 |
| 3,865,131 | 2/1975 | Jacobson | 137/432 |
| 4,122,862 | 10/1978 | Brandelli | 137/441 |
| 4,341,238 | 7/1982 | Roosa et al. | 137/432 |
| 4,573,496 | 3/1986 | Rothe et al. | 137/432 |
| 4,709,721 | 12/1987 | Gish | 137/441 |

Primary Examiner—George L. Walton
Attorney, Agent, or Firm—Donald D. Mon

[57] ABSTRACT

A tank valve for refilling a toilet tank and simultaneously supplying water to a toilet bowl has a riser, a valve mounted to the riser, a valving chamber in the body of the valve, and a downwardly directed outlet port from the valving chamber. A cuff surrounds the riser. It has a bottom with an aperture to pass the riser, and a peripheral sidewall extending upwardly from the bottom with an upper edge spaced from the body through which water from the outlet port into the cuff flows into the toilet tank. A fill port through the cuff leads by way of a hose to supply water to refill the toilet tank bowl.

5 Claims, 1 Drawing Sheet

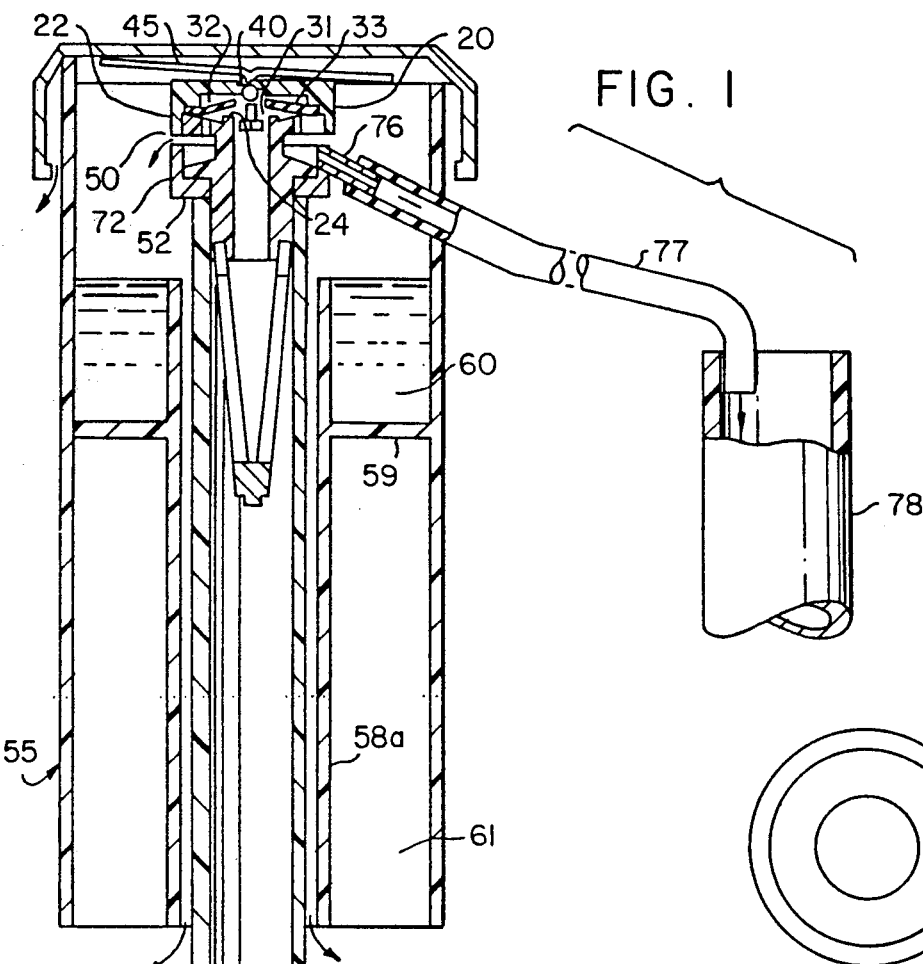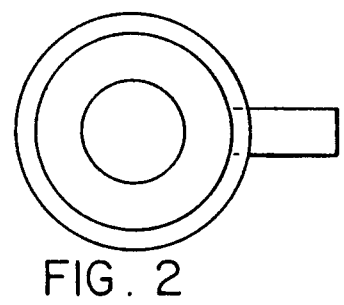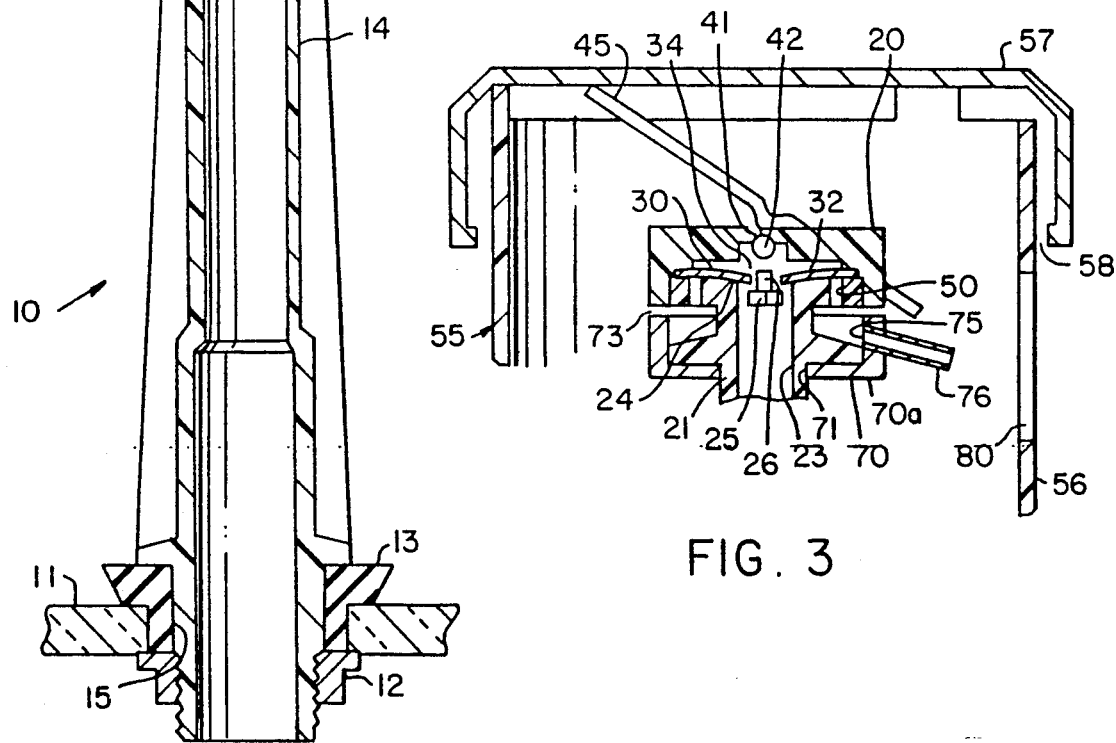
FIG. 1
FIG. 2
FIG. 3

BOWL FILL FOR A TANK VALVE

SPECIFICATION

1. Field of the Invention

This invention relates to tank valves of the type used to toilet tanks, and especially to an attachment which improves its bowl-fill system.

2. Background of the Invention

Tank valves for the purpose of refilling toilet tanks after each flush cycle are well-known. They are customarily controlled by a float mechanism which opens the valve to refill the tank when its water level is too low, and closes the valve when the tank has been refilled to a correct depth.

In addition to this function, the tank valve supplies a lesser quantity of water to the bowl itself so as to make a gas seal at the bottom of the bowl. This bowl refill operation occurs while the tank valve is open to refill the tank. It is usual for a conduit to extend from some part of the tank valve to the top of a standpipe that is part of the flush valve. The water from the tank, but the flush valve is opened to release the standpipe by-passes it to provide overflow protection. It discharges into the bowl, and for this reason the bowl refill water is conveniently sent through the standpipe.

There are other pathways available for the bowl fill water, and this invention is not limited to the described pathway It is merely exemplary of a very large number of bowl fill arrangements.

A problem with bowl fill arrangements generally is that they require special modifications of the tank valve itself, and that the quantity diverted may vary significantly as a function of rate of flow and structural dimensions.

It is an object of this invention to provide a simple attachment suitable for a wide range of tank valve sizes and styles which is directly applicable to many existing tank valves without structural change, and which provides assured diversion of water for the bowl fill.

BRIEF DESCRIPTION OF THE INVENTION

This invention is used in combination with a tank valve of the type which discharges water downwardly. Such a valve customarily sits atop a riser pipe and closes or opens to prevent or permit the flow of water through the valve into the tank from An attachment according to this invention comprises a cup-like cuff Which surrounds the riser beneath the valve outlet. It has a disc-like bottom an a peripheral sidewall. A fill port exits through the sidewall and is connectable to a hose that leads to and discharges into the standpipe. A peripheral gap remains between the upper edge of the sidewall and the bottom of the valve body through which water intended for the tank can exit division of water for the tank and for the standpipe occurs in this cuff, and can readily be determined by selecting and even by adjusting the size of the gap.

The cuff can readily be sized to fit on a conVentional riser, and generally will require no modification to the valve. An improved boWl fill system is thereby easily provided.

The above and other features of this invention ill be fully understood from the following detailed description and the accompanying drawings, in which:

BRIEF DESCRIPTION OF THE DRAWINGS

FIG. 1 is a side view, partly in axial cross-section, showing the presently-preferred embodiment of the invention, with the valve in its open condition;

FIG. 2 is a top view of the cuff of this invention; and

FIG. 3 is an enlarged portion of FIG. 1 showing the valve in its closed condition.

DETAILED DESCRIPTION OF THE INVENTION

Although this invention may be utilized with any tank valve which has a body and a downwardly-discharging outlet, it has it first and presently most pertinent use with a tan valve of the type shown in Roosa U.S. Pat. No. 4,341,238. This Roosa patent is incorporated therein by reference in its entirety for its showing of such a valve, of its structural details, and of its operation. Only those features necessary to an understanding of this invention will be given here. For additional details, reference may be made to the Roosa patent.

FIG. 1 of this instant patent will be recognized as FIG. 2 of the Roosa patent, modified to include this invention. FIG. 3 of this instant patent application will be recognized as the upper portion of Roosa's FIG. 3, foreshortened and with a portion of the invention added.

Tank valve 10 is mounted to the bottom 11 of a tank (not shown). A spud 12 and seal 13 fit riser 14 in an aperture 15 in the bottom of the tank. The riser extends upwardly to supply water under pressure to the valving mechanism 20 of the tank valve. This mechanism has a downwardly extending ported neck 21 which is threadedly attached to the top of the riser. The valve has a body 22.

A supply passage 23 through the neck interconnects the riser passage to a valve seat 24. A spider 25 holds a post 26 in passage 23, rising above the valve seat. Valve seat 24 represents the inlet port of the valve.

A valving chamber 30 in the body is divided into a lower flow portion 31 and an upper bias portion 32. A diaphragm 33 extends across the valving chamber to divide it into these portions. A bleed port 34 in the diaphragm has a diameter larger than that of the post so that the bleed port is always open to flow.

A vent port 40 extends through the top of the valve. A peripheral seat 41 extends around it. A ball 42 rests against seat 41 as shown in FIG. 8 to close port 40 when the valve is under pressure and is to be in its closed to flow condition. A pivoted actuator arm 4 with a contactor on it permits the ball to reach this position (FIG. 3) unless pressed down (FIG. 1) to open the vent port.

Outlet ports 50 from flow portion 81 direct water downwardly around the neck (or riser which is its equivalent). A shoulder 52 is formed around the neck below the outlet ports.

Control of this valve is accomplished by a float 55 in the shape of an inverted cup. The cup has a peripheral sidewall 56 and a cap 57. Gaps 8 are formed between them to release air and water from the top.

An internal sleeve 8a extends from the bottom of the float to an intermediate upper level. In between, a disc-like partition 59 forms an intermediate upper load region 60, open at its top to receive water and closed at its bottom to retain it. A buoyant chamber 61 is formed below the partition, closed at its top and open at its bottom to retain air to tend to lift the float in opposition to the weight of the float plus the weight of water in the load chamber.

To this point the description conforms to that of the Roosa valve. According to this invention, a cup-like cuff 70 having a disc-like bottom 70a with central aperture 71 is placed on the neck of the valve body. When the body is threaded into the riser, the cuff is held between shoulder 52 and the top of the riser. The cuff has a peripheral sidewall 72 extending upwardly. It is spaced radially outward from the body, beyond the outlet ports of the valve. A gap 73 remains between the body and the upper end of the cup to allow water to flow away from the valve. The size of this gap can be selected by shortening or lengthening the sidewall or otherwise modifying dimensions.

A fill port 75 in the cuff sidewall leads to a nipple 76 that receives the end of a hose 77. The hose in turn discharges into the upper end of a standpipe 78 that discharges directly to toilet bowl.

The operation of the valve is as follows. In the open condition (FIG. 1) the water level in the tank is lower and the tank is to be refilled. The float has lowered and pressed the contactor against the ball. This opens the vent port, and system pressure forces the diaphragm upwardly off of the valve seat. Water then flows from the inlet port, through the flow chamber, out the outlet port, and into the cuff.

The cuff inside the sidewall is full of water and under some pressure caused by the impediment to flow exerted by the cuff. Thus, some water will flow through the fill port to the standpipe to fill the bowl, and this will be a relatively reliable flow.

The remainder of the water flows through the gap, and out of the various exits shown by the arrows, into the tank.

When the tank is suitably filled, the float rises, enabling the ball to close the vent port (FIG. 3). Pressure builds up in the bias chamber. The flow chamber is vented. Accordingly the diaphragm moves down and closes the valve at the valve seat. Flow to the bowl will also cease.

A longitudinal slot 80 is formed in the outer wall of the float of length sufficient to enable the float to move through its full range without impediment by the hose. The hose passes through the wall of the float.

This invention thereby provides a simple, expedient and efficient means to provide bowl fill capability, and to provide it as a reliable function This invention is not to be limited by the embodiment shown in the drawings and described in the description, which is given by way of example and not of limitation, but only in accordance with the scope of the appended claims.

I claim:

1. In combination with a tank valve for refilling a toilet tank and simultaneously supplying water to a toilet bowl, said tank valve having a riser, a valve mounted to said riser said valve having a body, a valving chamber in the body, an inlet valve entering said valving chamber from the riser, and a downwardly directed outlet port from said valving chamber, the improvement comprising:

a cuff surrounding said riser, said cuff having a bottom with an aperture to pass the riser, and a peripheral sidewall extending upwardly from the bottom with an upper edge spaced by a gap from the body through which water discharged form the outlet port into said cuff flows into the toilet tank, a fill port through said cuff for connection to a hose through which water from the cuff flows to the toilet bowl simultaneously with flow through the gap to the toilet tank, said sidewall selectively being so proportioned and arranged that the flow through the gap and through the fill port are suitably proportioned for both purposes.

2. Apparatus according to claim 1 in which the bottom of the cuff is held between the top of the riser and a shoulder on the valve body.

3. Apparatus according to claim 2 in which a nipple is fitted into the fill port to be connected to said hose.

4. Apparatus according to claim 2 in which said tank valve includes an inverted cup float surrounding said valve body and adapted to control the flow condition of the tank valve, said float including a peripheral float sidewall, said float sidewall having a slot therethrough to pass said hose without impeding the vertical movement of the float.

5. Apparatus according to claim 1 in which the peripheral wall is cylindrical, and in which the axial length of the sidewall can be varied to provide a gap of suitable size for proportioning the flow to the tank and to the bowl.

* * * * *